United States Patent [19]
Giesfeldt et al.

[11] Patent Number: 5,855,659
[45] Date of Patent: Jan. 5, 1999

[54] INSTANT CORRUGATING ADHESIVE

[75] Inventors: J.E. Todd Giesfeldt, LaGrange; Jack R. Wallace, Bolingbrook; Tammi Brandt-Janel, New Lenox, all of Ill.

[73] Assignee: Corn Products International, Inc., Bedford Park, Ill.

[21] Appl. No.: 855,138

[22] Filed: May 13, 1997

[51] Int. Cl.[6] .............................. C08L 3/02; C08L 5/14; C09J 103/02; C09J 105/14
[52] U.S. Cl. .............................. 106/163.01; 106/162.9; 106/165.01; 156/336; 428/182; 428/183; 428/184
[58] Field of Search ............ 106/163.01, 165.01, 106/162.9; 156/336; 428/182, 183, 184

[56] References Cited

U.S. PATENT DOCUMENTS

| | | | |
|---|---|---|---|
| 1,311,980 | 8/1919 | Loomis | 162/16 |
| 1,762,481 | 6/1930 | Marr | 162/14 |
| 1,941,350 | 12/1933 | Hawerlander | 162/16 |
| 2,716,613 | 8/1955 | Schoen | 106/165.01 |
| 2,772,981 | 12/1956 | Smart | 106/163.01 |
| 2,801,955 | 8/1957 | Rutenberg et al. | 435/277 |
| 2,868,778 | 12/1959 | Watson et al. | 536/114 |
| 4,070,314 | 1/1978 | Alexander et al. | 524/14 |
| 4,107,379 | 8/1978 | Stofko | 428/326 |
| 4,181,534 | 1/1980 | Headley | 127/67 |
| 4,587,332 | 5/1986 | Lane et al. | 536/102 |
| 5,358,559 | 10/1994 | Fitt et al. | 106/163.01 |
| 5,501,860 | 3/1996 | Maeda et al. | 424/464 |
| 5,503,668 | 4/1996 | Giesfeldt et al. | 106/217.7 |
| 5,633,032 | 5/1997 | Greenshields et al. | 426/618 |

*Primary Examiner*—Peter A. Szekely
*Attorney, Agent, or Firm*—Norris, McLaughlin & Marcus

[57] ABSTRACT

An instant corrugating adhesive composition comprising a dry blend of starch and a dried pre-solubilized cellulosic extract. The composition can easily be rehydrated with water to make a corrugating adhesive. The corrugating adhesive is formulated without boron compounds and with minimal or no addition of alkali. The dried pre-solubilized cellulosic extract, which includes hemicellulose as a major component, functions as the carrier portion of the corrugating adhesive. No initial cooking step is required to make the carrier and rehydration can be conducted at ambient temperatures.

17 Claims, No Drawings

INSTANT CORRUGATING ADHESIVE

BACKGROUND OF THE INVENTION

1. Field of the Invention

The present invention relates to starch-based corrugating adhesive compositions. In particular, the invention has to do with a dry blend composition which easily can be rehydrated with water to make a corrugating adhesive. The adhesive is made without boron compounds and with minimal or no added alkali.

2. The Related Art

There is ever increasing customer pressure to reduce or eliminate the chemicals normally used in corrugating adhesive formulations. This market trend is being driven by environmental discharge and safety concerns. There is also a need for corrugating adhesives which are easy to use and which are stable over long periods of time. Commercially acceptable corrugating adhesives having these characteristics have not heretofore been described.

In the corrugating process, adhesive is commonly applied to the tips of the flutes of a corrugated medium. Then a noncorrugated flat paper liner is applied against the adhesive coated flutes as they pass between a corrugating roll and a pressure roll. The resulting product has the corrugating medium on one side and a flat liner on the other side and is called a single-face portion. The single-face portion may be used "as is" (called a "single face" board) or adhesive may be applied to the flute tips of the single-face portion and a second flat sheet can be applied in the same manner as the first in what is called a "double-face" or a "double-back" operation. The second liner sheet is treated with heat and reduced pressure (relative to the pressure used to make a single-face portion) immediately following contact with the adhesive.

Starch-based adhesives which can be of the carrier, no-carrier and carrier-no-carrier type are commonly used in processes for manufacturing corrugated paper board. In carrier type adhesives, a portion of the starch (or dextrin) forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, all of the starch is slightly cooked or swollen with heat and caustic soda for viscosity. Finally, carrier-no-carrier type adhesives have a portion of the starch which forms a carrier and is responsible for about one half of the viscosity and the remaining viscosity is obtained by slightly swelling the uncooked starch.

A water soluble adhesive composition is described in U.S. Pat. No. 2,716,613. The adhesive is comprised of a lignocellulose which is hydrolyzed under elevated temperature and pressure in the presence of moisture. A water soluble reaction product is recovered and concentrated to dryness. Rehydration is accomplished by forming a slurry with methanol and refluxing while passing ammonia therethrough. This composition also can be filtered and dried.

A hemicellulose additive for paper coating compositions is described in U.S. Pat. No. 2,772,981. The hemicellulose is described as a composition that can completely replace the adhesive component in paper coatings, but preferably it is added with starch, dextrin or the like. The patent does not describe a dry rehydratable composition.

Corrugating adhesives having a solubilized fiber component are described by Fitt in U.S. Pat. No. 5,358,559 and by Giesfeldt et al. in U.S. Pat. No. 5,503,668. These are wet adhesives employing in situ solubilization processes.

Unlike the present invention, the foregoing references do not describe dry, rehydratable adhesive compositions having commercially acceptable characteristics for use in the corrugating industry.

In the present specification and claims, all parts and percentages are by weight/weight (w/w) unless otherwise specified.

SUMMARY OF THE INVENTION

A dry blend composition of an extracted hemicellulose material, defined herein as a dry, free-flowing, alkali-extracted plant fiber having from about 25% to about 100% and preferably from about 70% to 100% dry basis soluble material, and starch can be rehydrated by adding water without any other ingredients to make a corrugating adhesive. The amount of extracted hemicellulose material in the dry blend composition is generally from about 5% to about 50% and preferably from about 8% to about 30%. The extracted hemicellulose material functions as the carrier portion of the adhesive. Cereal grains are an important source of hemicellulose and in a preferred embodiment the extracted hemicellulose material is extracted from corn fiber or wheat fiber, corn fiber being most preferred.

Variability in the percentage of soluble materials in the extracted hemicellulose material (sometimes referred to herein as "the extract" or "extracts") will affect the amount required to make the dry blend composition, with higher percentages of solubles allowing for the use of lower amounts of extract. For example, an extract having 100% solubles can be used in lower concentrations than an extract having 50% solubles. If we assume the extract is comprised of 100% solubles, then the percentage of solubles available from the extract in the dry blend composition should be from about 8% to about 15% and preferably from about 9% to about 14% based on total weight of the dry blend composition.

The corrugating paste of the invention is prepared without a cooking step by hydrating the dry blend composition in a single tank, high or low shear, batch mixer or in continuous mixers such as a Warner & Pfleiderer single or twin screw extruder, Baker Perkins Rotofeed mixer or a Kenis Corporation static mixer. Hydrating is accomplished by mixing for from about 5 to 10 minutes or for a sufficient time to hydrate the composition into a smooth paste. Accordingly, an instant corrugating adhesive is obtained without adding boron compounds and with minimal or no addition of alkali. In most applications, the need to add alkali is avoided when sufficient alkali is present in the extract to provide a pH from about 7 to about 14 in the adhesive paste. Because the carrier phase is pre-solubilized with alkali, sufficient alkali usually will be present to attain the requisite pH to form a good bond (caustic "bite" into the paper) and lower the gel temperature.

DESCRIPTION OF THE PREFERRED EMBODIMENTS

The dry blend composition is comprised of an extracted hemicellulose material and starch. The composition is made with no boron compounds (e.g., no borax and no boric acid) and, depending upon the type of starch employed, it can be made with no added alkali or a minimal amount of added alkali.

The amount of extracted hemicellulose material in the dry blend composition is generally from about 5% to about 50% and preferably from about 8% to about 30%. These ranges, however, contemplate using extracts having from about 25% to about 100%, preferably from about 70% to about 100% dry basis soluble material and, as noted above, variability in the percentage of soluble materials in the extract will affect the amount required to make the dry blend composition, as will be apparent to those skilled in the art based on the disclosure herein. Extracts having higher percentages of solubles can be used in lower amounts than extracts having lower percentages of solubles. The percentage of solubles available from the extract in the dry blend composition should be from about 5% to about 50% and preferably from about 8% to about 30% based on total weight of the dry blend composition. The extracted hemicellulose material referred to herein as a dried pre-solubilized cellulosic extract has from about 3% to about 10% moisture and functions as the carrier or cooked portion when the adhesive is hydrated.

The corrugating paste of the invention is prepared by hydrating the dry blend composition in a single tank or a continuous mixer without a primary cooking step to make the carrier portion. Hydrating is accomplished by admixing the dry blend composition with sufficient water to make an adhesive paste having a total moisture content from about 65% to about 80%. Admixing is continued for from about 5 to 10 minutes or for a sufficient time (which may be shorter or longer) to hydrate the composition into a smooth paste. The temperature of hydration is relatively low, generally from about 18°–52° C. (65°–125° F.) and the time required for hydration is generally shorter at higher temperatures. Accordingly, an instant corrugating adhesive is obtained with minimal or no addition of alkali and there is no need to have boron compounds in the formulation at all.

When the starch is a corn starch, such as pearl starch, the need to add alkali is avoided when sufficient residual alkali is present in the cellulosic extract to provide a pH from about 7 to about 14 in the adhesive paste. If alkali is needed, however, it can be added before or after the dry blend composition is added to the water. This relates to gelatinization temperature which can vary depending upon the type of starch employed. For example, we have found that suitable corrugating adhesives can be made using no added caustic when barley starch is employed. Accordingly, if the gelatinization temperature of the starch is in the range from about 6020 C.–66° C. (140° F.–150° F.), the adhesive an be made with no added caustic or relatively little added caustic. Another way to look at this is to say that sufficient caustic is employed to bring the gelatinization temperature of the adhesive in the range of from about 54° C. (130° F.) to about 72° C. (162° F.), preferably from about 60° C. (140° F.) to about 68° C. (155° F.), irrespective of the pH.

The starch ingredient of the invention can be derived by conventional means from the root, stem or fruit of a number of plants and it can have a moisture content from about 5% to about 15%, most commonly from about 8% to about 12%.

Preferred starches are those made from corn and barley, but other starches such as those derived from wheat, tapioca, potato and the like are suitable. Blends of starches from various sources also can be used. The starches also can be modified and can be combinations of modified and unmodified starch. Dextrins also can be used by themselves or in combination with unmodified and/or modified starches. Low gelatinization temperatures are preferred and barley is a preferred unmodified starch for this reason. Corn starch, however, which has a relatively high gel temperature, is preferred when economics are the most important consideration.

The extracted hemicellulose material of the invention is prepared by treating plant fiber with an alkaline extraction agent. Any strong base can be used, but the preferred bases are alkali metal hydroxides, most preferably calcium hydroxide, potassium hydroxide or sodium hydroxide and these are generally referred to herein as alkali. Any plant fiber that is rich in hemicellulose can be used. Preferred sources are corn fiber, including corn hulls, husks and germ, wheat fiber and barley fiber. The most important characteristic to consider in selecting suitable plant materials is the percentage of solubles, and the solubles do not have to be 100% hemicellulose. The presence of minor amounts of soluble protein, other soluble celluloses, some starch and the like is not detrimental as long as they do not exceed about 50%, preferably about 30% or less and most preferably 5% or less of total solubles. When there are too many insolubles, they act as a diluent and bonding strength is reduced. Insolubles, accordingly, should not exceed about 75% of the plant material and preferably should not exceed about 30% of the plant material.

Hemicellulose is a natural polymer present in many living plants and it can be derived from various sources for use according to the invention. Its name is derived from its close association with cellulose in the plant tissue and once it was thought to be a precursor to cellulose synthesis. It is a relatively strong material that resists breakdown through mechanical shearing and the subsequent loss of viscosity. It is completely compatible with starch. Hemicellulose can be partially hydrolyzed if desired to reduce its molecular weight and enhance its viscosity characteristics.

Hemicellulose is based on a 5-member xylan (pentosans) structure having additional side chains such as arabanoxylan and glucuronic acid. The skeleton configuration is beta, 1, 4 linkages similar to those found in cellulose. Although its molecular structure is different from starch and cellulose, the key to its similarity is the many functional hydroxyl groups available for bonding. The structure for hemicellulose can vary substantially, but a generalized form of the structure is illustrated below:

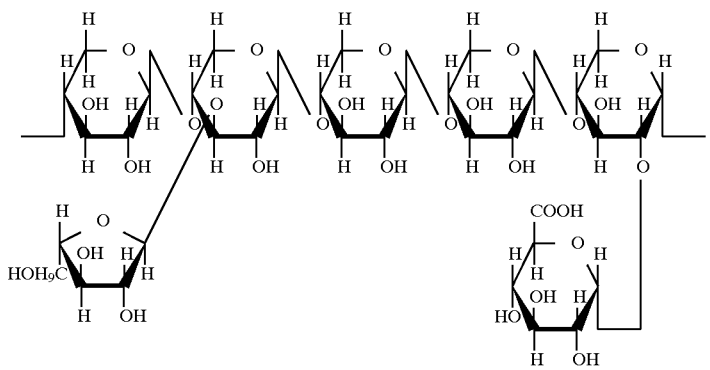

The pericarp or hull of a corn kernel is a particularly good source of hemicellulose because it is high in hemicellulose content, the hemicellulose is readily extracted from it and it is abundantly available, one of the largest, potential, uncontaminated (i.e., not detrimental to the corrugating process) sources of hemicellulose is corn fiber produced by the corn wet milling industry. A preferred type of corn fiber is dietary corn fiber which is sold under the designation PEERLESS® corn fiber by the Corn Products Unit of CPC International Inc., P.O. Box 8000, Englewood Cliffs, N.J. 07632 USA.

A preferred embodiment of the invention is a dry blend composition which can be hydrated with water to make a corrugating adhesive (also referred to herein as an adhesive paste) comprising, consisting essentially of or consisting of from about 95% to about 50% starch, from about 5% to about 50% of a dried pre-solubilized cellulosic extract containing from about 25%–100% dry basis soluble material and no boron compound. The dried pre-solubilized cellulosic extract will contain some residual alkali, and when sufficient residual alkali is present to provide a pH from about 7 to about 14 in the adhesive paste or a gelatinization (also referred to herein as "gel") temperature of the adhesive from about 54° C.–72° C. (130° F.–162° F.), preferably from about 60° C.–68° C. (140° F.–155° F.), it is not necessary to add alkali when making the paste. The starch generally will have a moisture content from about 8% to about 12% and the dried pre-solubilized cellulosic extract will have a moisture content from about 3% to about 10%.

When the foregoing preferred dry blend composition is rehydrated to make an adhesive paste, sufficient water is admixed with the dry blend to bring the total moisture content up to about 65% to about 80%.

In a most preferred embodiment, a byproduct is used of the process described in Greenshields, et al., U.S. Pat. No. 5,633,032, the disclosure of which is incorporated by reference herein in its entirety. This byproduct, designated as Z-SOL and available from CPC International Inc., Englewood Cliffs, N.J. 07632 USA, can be prepared as follows:

1. Dry milled purified corn fiber is suspended in a 10% weight/volume ("w/v") solution. The purified corn fiber or bran can be a 90% total dietary fiber ("TDF") from Vetter press cake derived from corn hulls or dry milled fiber at 90% TDF.
2. Potassium hydroxide (KOH) is added to the suspended purified corn fiber to a concentration of 1.5% w/v and held at 80° C. (176° F.) for 2.5 hours to extract the hemicellulose (and any remaining starch and some protein) from the insoluble material, primarily insoluble cellulose, in the corn fiber.
3. The solution of water, fiber and KOH is diluted with an equal volume of 80° C. water and filtered. Cheesecloth can be used as the filter medium.
4. The filtrate contains the soluble Z-SOL and this can be neutralized with hydrochloric acid (HCl) if neutralization is desired. The Z-SOL then is precipitated out using alcohol. This material can then be spray-dried or dried in an oven.
5. The dried material is ground to the correct particle size and, according to the present invention, is then dry blended with starch to make the dry blend composition of the present invention.

The preparation of corrugating paste from the dry blend composition is quite simple. The primary concern is the time needed to hydrate the material. Lumps may form initially, and it may take a few minutes before they disappear. As explained above, elevating the temperature somewhat above ambient will make it easier to rehydrate the dry blend composition.

In addition to the most preferred embodiment for the dry, pre-solubilized cellulosic extract of the invention, various other preferred embodiments which do not have the same level of purity as Z-SOL can be employed according to the invention.

Low total dietary fiber ("TDF") Vetter press cake and alkali treated spent germ can be treated in a single step process to make a pre-solubilized dry material that contains about 25–50% solubles, including hemicellulose and some soluble starch and soluble protein. In our experimental work, the alkali treated Vetter press fiber was employed in the dry blend composition at a level of 20–35%, while the alkali treated spent germ was employed in the dry blend composition at a level of 18–28%. In contrast, Z-SOL, which contains about 100% solubles, can be employed preferably in the 8% to 12% range. This work defined a preferred range of concentrations for dry, pre-solubilized corn fiber of from about 8% to 30%. Any less than 8% does not provide enough carrier to give viscosity stability or to prevent the paste from separating after a short period of time. Any more than about 30% of the low solubles, dry, pre-solubilized fiber causes insoluble material to impair the quality of the bond.

It is a theory of the invention that there may be a component in the insoluble material that is beneficial to making a good strong bond. Perhaps the remaining cellulose with a certain amount of hemicellulose still attached exists as "sticky" little cubes or platelets that bridge gaps in the paper.

EXAMPLES

Example 1

A dry blend composition of 88% commercial basis (C.B.) pearl starch and 12% Z-SOL was prepared in the laboratory as follows:

| Rehydration | |
|---|---|
| Add water to a 4 liter tank (water temperature is ambient) | 2022 ml |
| Add dry blend composition | 675 g |
| Mix | 10 minutes |
| Add alkali (50% NaOH) | 31 g |
| Mix/Heat | 10 min./38° C. |
| Analysis | |
| Final Temperature | 38° C. |
| Stein-Hall Viscosity: | 40 sec. |
| Gel Temperature: | 62–66° C. |
| % Solids: C.B. | 25% |
| Stability | |

Finished paste was set in a water bath @ 38° C. immediately with agitation cycles using a propeller blade stirrer for 5 minutes on and 25 minutes off every 30 minutes.

| Time | Stein Hall Viscosity, Sec. | Remarks |
|---|---|---|
| 1 hour | 40 | No starch settling on bottom, foam accumulation in center of holding beaker. |
| 2 hours | 41 | No starch settling on bottom, foam accumulation in center of holding beaker. |
| overnight (18 hours) | 40 | No starch settling on bottom, no foam accumulation. |

Example 2

Pilot plant trials were made at the Institute of Paper Science and Technology (IPST), Atlanta, Ga. using their 14 inch Langston singleface corrugator equipped with C-flut rolls. The machine ran at commercial speeds using 42 pound Kraft liner, or 35 pound high performance liner, both in conjunction with 26 pound medium. A dry blend composition of 88% C.B. pearl starch and 12% Z-SOL was prepared by adding the ingredients to a twin shell dry blender and blending 40 pounds at 25 RPM for 10 minutes. The dry blend composition was rehydrated to make a paste.

The corrugator applied the paste to the flute tips of the fluted and heated medium just before the medium contacted the heated liner under pressure, forming the first bond in the process of making a finished sheet of corrugated board. The paste was made using a 40 gallon mixer equipped with a constant speed paddle blade stirrer, producing approximately 10 gallons of paste. The finished paste was transferred to an insulated 20 gallon storage tank. A small vane pump circulated the paste from the storage tank to a single-facer corrugating machine.

The formulations and results are summarized in Table 1. The compositions having 12% (w/w total C.B. weight) Z-SOL in the carrier phase has characteristics similar to a normal all starch paste formula. The 8% Z-SOL paste, also ran reasonably well, but the paste quickly developed a liquid layer after setting a few minutes without agitation because of insufficient solids in the carrier phase. Laboratory work with Z-SOL at 15% resulted in finished paste with a high viscosity. At this Z-SOL level, the finished paste viscosity increased to an unusable level. Accordingly, the Z-SOL level should be less than about 15%.

Paste Q4 (Table 1) was a no boron compound, no alkali paste. This paste was made with the Z-SOL pre-mix in a 33% C.B. total solids formula. The percent C.B. total solids for this formula is high by normal standards. Most commercial corrugating pastes fall in the range of 20 to 30% C.B. total solids. Thirty-three percent C.B. solids would normally be more solids than a commercially produced carrier starch (modified or unmodified) could suspend. This higher percent C.B. solids is achievable with the carrier phase made from pre-solubilized plant fiber. The high percent C.B. solids is important because less heat is needed by the corrugator due to the lower amount of water which has to be evaporated. Since less heat is needed to evaporate water, there is more heat available to gelatinize the starch, which allows for the use of paste made with a higher than normal gelatinization temperature. In this case, a paste made with corn starch/pre-solubilized plant fiber, but without added alkali, had a gelatinization temperature in the range of 68°–70° C. (155°–158° F.). This compares with a gelatinization temperature of 71°–74° C. (160°–165° F.) for corn starch alone and indicates that the pre-solubilized cellulosic extract carrier of the invention causes a lowering of the gel temperature.

Accordingly, an embodiment of the invention is a dry composition for making a carrier which comprises, consists essentially of or consists of the dried pre-solubilized cellulosic extract described herein. The dry composition is rehydrated and becomes a carrier when making the adhesive paste in accordance with the foregoing description.

Paste Q4 ran well on the IPST 14 inch Langston single face machine using 35 pound high performance liner and 26 pound medium (Table 2). The paste showed no liquid layer after setting.

The last paste on Table 1, T1, was made from a Z-SOL/barley starch dry blend. This no borax, no added caustic paste ran exceptionally well on the machine. The paste hydrated very quickly, and it ran on the machine within 15 minutes after admixing the dry blend with the water. The gelatinization temperature measured 66° C. (150° F.).

When barley starch is substituted for pearl starch, the gelatinization temperature is lowered from about 74° C. (165° F.) to about 66° C. (150° F.), making it possible to prepare a no caustic adhesive at a normal solids level because the gelatinization temperature for barley starch is about 5°–15° C. lower than for corn starch. Other starches and modified starches having gelatinization temperatures similar to those for barley would be expected to function similarly.

TABLE 1

Pilot Plant Trials
No borax, low or no caustic corrugating adhesive

| | Alkali pastes | | | | No alkali pastes | |
|---|---|---|---|---|---|---|
| Run | Q1 | Q2 | Q3 | Q4 | T1 | |
| Date | 7-Feb | 23-Apr | 23-Apr | 24-Apr | 28-Jun | |
| Type of Fiber | Z-SOL | Z-SOL | Z-SOL | Z-SOL | Z-SOL | |

TABLE 1-continued

Pilot Plant Trials
No borax, low or no caustic corrugating adhesive

|  | Alkali pastes | | | | No alkali pastes | |
|---|---|---|---|---|---|---|
| Type of pearl starch | corn | corn | corn | corn | barley | |
| Soluble fiber substitution, % | 12 | 12 | 8 | 12 | | 12 |
| Boron Compounds | No | No | No | No | No | |
| Alkali | Yes | Yes | Yes | No | No | |
| Formula | | | | | | |
| Water, L | 38 | 36 | 36 | 38 | 40 | |
| Heat, F. | 105 | 120 | 100 | 105 | 120 | |
| Soluble fiber/pearl starch, lb | 28 | 22 | 34 | 41 | 29.4 | |
| Mix, Min | 19 | 10 | 10 | 10 | 10 | |
| Sodium hydroxide (50/50), g | 576 | 464 | 370 | 0 | 0 | |
| Mix, Min | 10 | 10 | 10 | 0 | 0 | |
| Finish, F | 84 | 81 | 93 | 97 | 100 | |
| Finish viscosity, Sec (Stein-Hall) | 47 | 67 | 26 | 67 | 26 | |
| Finish gel temperature, F. | 142 | 145 | 147 | 155–158 | 150 | |

Table 2 shows the pilot plant corrugation results associated with each batch of paste. The test runs are labeled by: pre-mix code number, high performance liner run with low paper temperature ("HPL") or high performance liner with high paper temperature ("HPH"), and glue roll gap in thousand of an inch:

```
Q1 runs -  Q1-HPL-8      Q1-HPH-8
           Q1-HPL-12     Q1-HPH-12
           Q1-HPL-20     Q1-HPH-20
Q2 runs -  Q2-HPL-12
           Q2-HPL-20
Q3 runs -  Q3-HPL-12
           Q3-HPL-20
Q4-runs -  Q4-HPL-8
           Q4-HPL-12
```

Samples from each run were taken at 300 feet per minute (fpm), 500 fpm and 700 fpm (or higher speed before complete delamination). The edge crush, flat crush, single-face dry pin adhesion and % fiber pull were measured for each sample using TAPPI test methods[1]. All of the numbers are as good as or better than the results on this machine for conventional carrier starch adhesives. The Q1 edge crush results were superior to all of the edge crush results from the previous runs.

[1] The technical Association of Pulp and Paper Industry, Inc. TAPPI) tests included Dry Pin Adhesion (TAPPI T821) for bond strength, edge crush and flat crush. Details of the test methods are published in TAPPI Test Methods 1989, available from TAPPI, One Dunwoody Park, Atlanta, Ga. 30341 U.S.A.

The green bond measurement was made by inserting a device with two wedges placed across from each other at the edges of the single-face linerboard, six inches from the nip on the discharge side of the corrugating rolls. The wedges clear the liner, while producing an upward force on the outer edges of the medium causing it to start to delaminate from the linerboard. Delamination progresses inwardly toward the center as the machine speed is increased. A strong green bond produces very little delamination beyond the outer edge of the medium. As machine speed increases green bond weakens and delamination of the medium from the liner progresses inwardly toward the center of the single face web.

The measurements used to represent green bond strength were taken from Batelka, J. J., Tappi J. 75(10):94 (1992) The Institute of Paper Science & Technology, Atlanta, Ga. This work used only induction time. This is the time it takes to form enough of a green bond to hold at least some of the medium to the center of the liner. For example, a typical induction time was 80 milliseconds. In other words, it took at least 80 milliseconds from the time the paper left the nip for the green bond to set enough to hold some of the medium to the liner as the medium went past the wedge. Induction time was calculated using formula (1).

(1) Time (ms)=[6 in./machine speed×12]×60×1000

Pearl carrier starch paste induction time was 50 milliseconds (ms). Our carrier starch pastes were between 60 and 80 ms. Minimum induction time is the minimum time needed for a bond to form.

TABLE 1A

NO BORAX INSTANT CORRUGATING ADHESIVE
IPST GREEN BOND PILOT PLANT RESULTS (2)

| Paste - IPST Run No. | Max speed (fpm) | Minimum Induction time, milliseconds |
|---|---|---|
| Q1-HPL-20 | 355 | 85 |
| Q2-HPL-12 | 438 | 68 |
| Q2-HPS-20 | 415 | 72 |
| Q3-HPH-12 | 388 | 77 |
| Q3-HPH-20 | 363 | 83 |
| Q4-HPL-12 | 345 | 87 |
| Q4-HPL-8 | 388 | 77 |

(2) IPST 14" Langston singleface machine with wedge inserted 6 inches from the nip.

TABLE 2

Test Results

| Sample Identification | | Edge Crush (#/In) | | Flat Crush (PSI) | | Single-Face Pin Adhesion (#/24 Ln In) | | Fiber Pull |
|---|---|---|---|---|---|---|---|---|
| | | Avg. | S.D. | Avg. | S.D. | Average | Std. Dev. | (%) |
| *CPC February IPST Single-Facer Trial* | | | | | | | | |
| 207-Q1-HPL-8 | 300 fpm | 23.2 | 2.0 | 35.8 | 1.0 | 72.5 | 7.9 | Medium |
| | 500 fpm | 24.4 | 1.0 | 38.0 | 1.8 | 77.2 | 7.9 | Medium |
| | 700 fpm | 24.6 | 2.2 | 38.6 | 0.5 | 56.6 | 8.0 | 0% |
| 207-Q1-HPL-12 | 300 fpm | 27.0 | 1.9 | 37.6 | 1.9 | 85.0 | 6.3 | Medium |
| | 500 fpm | 27.0 | 1.8 | 39.2 | 0.7 | 90.1 | 2.3 | Medium |
| | 700 fpm | 25.5 | 3.2 | 37.3 | 1.9 | 70.3 | 10.9 | 0% |
| 207-Q1-HPL-20 | 300 fpm | 28.4 | 1.3 | 37.1 | 1.0 | 111.8 | 4.2 | Medium |
| | 500 fpm | 28.7 | 1.2 | 38.8 | 0.9 | 108.3 | 3.1 | Medium |
| | 700 fpm | 25.5 | 1.5 | 39.2 | 1.8 | 52.8 | 11.6 | 0% |
| 206-P3-HPL-12 | 300 fpm | 24.3 | 1.5 | 36.1 | 1.4 | 73.8 | 11.6 | Medium |
| | 500 fpm | 25.8 | 1.5 | 38.9 | 0.8 | 80.8 | 7.4 | Medium |
| | 700 fpm | 23.9 | 1.3 | 43.0 | 1.0 | 73.2 | 9.0 | Medium |
| 206-P3-HPL-20 | 300 fpm | 26.9 | 1.5 | 36.6 | 0.5 | 96.0 | 11.6 | Medium |
| | 500 fpm | 27.0 | 2.0 | 37.5 | 0.8 | 91.0 | 5.2 | Medium |
| | 700 fpm | 26.1 | 1.0 | 41.1 | 1.0 | 81.2 | 5.6 | Medium |
| 206-P3-KRH-12 | 300 fpm | 22.5 | 1.7 | 30.9 | 1.1 | 102.8 | 3.7 | Medium |
| | 500 fpm | 24.3 | 2.3 | 30.5 | 1.4 | 82.6 | 4.1 | Medium |
| | 700 fpm | 24.1 | 1.8 | 32.1 | 0.9 | 73.7 | 5.8 | Medium |
| 206-P3-KRH-20 | 300 fpm | 26.3 | 2.1 | 31.7 | 1.1 | 112.7 | 5.9 | Medium |
| | 500 fpm | 24.1 | 1.6 | 30.3 | 1.1 | 103.9 | 4.9 | Medium |
| | 700 fpm | 22.2 | 2.0 | 33.2 | 1.2 | 93.6 | 6.4 | Medium |
| 207-Q1-HPH-8 | 300 fpm | 23.8 | 1.9 | 37.0 | 0.8 | 68.3 | 3.7 | Medium |
| | 500 fpm | 25.4 | 1.7 | 38.6 | 0.9 | 70.9 | 2.9 | Medium |
| | 700 fpm | 22.8 | 2.8 | 37.3 | 1.4 | 58.5 | 5.3 | Medium |
| 207-Q1-HPH-12 | 300 fpm | 24.8 | 1.9 | 36.1 | 1.7 | 79.1 | 5.4 | Medium |
| | 500 fpm | 25.6 | 1.0 | 38.4 | 1.4 | 91.5 | 5.9 | Medium |
| | 700 fpm | 24.0 | 1.0 | 38.0 | 1.7 | 61.2 | 8.1 | Medium |
| 207-Q1-HPH-20 | 300 fpm | 28.1 | 1.7 | 37.5 | 0.7 | 107.5 | 6.3 | Medium |
| | 500 fpm | 24.7 | 1.5 | 40.0 | 1.0 | 109.2 | 6.5 | Medium |
| | 600 fpm | 26.3 | 1.5 | 39.9 | 1.1 | 105.5 | 4.8 | Medium |
| | 700 fpm | 24.4 | 2.7 | 40.1 | 1.7 | 99.0 | 5.9 | Medium |
| *CPC Single-Facer Trial* | | | | | | | | |
| 423Q2HPL-12 | 300 | 21.2 | 2.1 | 31.4 | 0.5 | 77.7 | 5.9 | M |
| | 500 | 19.9 | 1.2 | 31.5 | 1.8 | 81.3 | 4.7 | M |
| | 700 | 21.0 | 1.3 | 32.8 | 1.5 | 75.3 | 1.7 | M |
| 423Q2HPL-20 | 300 | 19.7 | 1.3 | 30.5 | 0.6 | 107.6 | 4.7 | M |
| | 500 | 20.3 | 1.5 | 32.3 | 1.2 | 97.9 | 3.7 | M |
| | 700 | 21.1 | 2.2 | 31.4 | 1.2 | 68.4 | 2.4 | M |
| 423Q3HPL-12 | 300 | 20.1 | 1.9 | 31.5 | 0.9 | 111.4 | 3.9 | M |
| | 500 | 20.3 | 1.9 | 31.5 | 1.6 | 90.8 | 6.8 | M |
| | 700 | 21.8 | 1.8 | 32.8 | 2.6 | 52.7 | 9.3 | O |
| 423Q3HPL-20 | 300 | 22.8 | 2.2 | 30.1 | 0.5 | 114.0 | 6.1 | M |
| | 500 | 20.5 | 2.2 | 31.4 | 0.6 | 51.2 | 7.8 | O |
| | 615 | 22.3 | 1.3 | 30.9 | 1.0 | 44.5 | 9.2 | OW |
| 423Q4HPL-12 | 600 | 19.7 | 1.9 | 35.2 | 1.3 | 57.2 | 13.1 | O |
| 423Q4HPL-08 | 300 | 19.9 | 2.0 | 33.1 | 1.8 | 89.2 | 2.5 | M |
| | 500 | 21.3 | 1.4 | 35.2 | 0.8 | 87.5 | 1.9 | M |
| | 600 | 21.2 | 1.4 | 33.5 | 0.8 | 67.1 | 9.7 | M |
| | 700 | 19.7 | 1.4 | 33.9 | 1.2 | 56.1 | 8.6 | O |
| 424Q4HPL-12 | 300 | 22.1 | 2.2 | 32.6 | 1.5 | 101.4 | 2.5 | M |
| | 500 | 20.0 | 2.7 | 32.3 | 1.2 | 88.2 | 5.1 | M |
| 4244Q4HSKR-08 | 300 | 24.0 | 1.5 | 29.9 | 0.6 | 81.0 | 8.3 | M |
| | 500 | 21.9 | 0.9 | 31.7 | 0.6 | 84.0 | 5.2 | M |
| | 600 | 22.4 | 2.2 | 32.8 | 0.5 | 81.4 | 3.5 | M |
| | 650 | 25.0 | 1.8 | 29.8 | 1.3 | 63.8 | 7.8 | M |
| 424Q4HSKRH-12 | 300 | 25.7 | 1.1 | 30.1 | 1.0 | 108.6 | 2.4 | M |
| | 500 | 24.7 | 1.3 | 31.0 | 0.6 | 104.9 | 5.3 | M |
| | 550 | 22.1 | 1.5 | 30.6 | 0.4 | 86.3 | 7.5 | M |
| | 600 | 24.4 | 2.0 | 30.6 | 1.1 | 68.1 | 27.1 | O |

TABLE 2A

Test Results
CPC Single-Facer Trial

| Sample Identification | | Edge Crush (#/In) | | Flat Crush (PSI) | | Single-Face Pin Adhesion (#/24 Ln In) | | Fiber Pull |
|---|---|---|---|---|---|---|---|---|
| | | Avg. | S.D. | Avg. | S.D. | Average | Std. Dev. | (%) |
| 628-T1-KRH-12 | -300 | 23.0 | 1.9 | 28.8 | 0.7 | 94.7 | 3.8 | 10 |
| | -500 | 21.3 | 2.1 | 30.3 | 0.6 | 95.4 | 1.8 | 0* |
| | -600 | 21.6 | 1.5 | 30.0 | 0.9 | 78.1 | 11.6 | 0 |
| | -700 | 22.0 | 1.7 | 30.6 | 0.8 | 77.4 | 6.7 | 0 |

Example 3

All of the Q series pastes made with Z-SOL showed good viscosity stability over 24 and 48 hours. Table 3 shows the results. The pastes were held overnight in an unheated container. Temperature and viscosity were measured, then the paste was heated to 100° F. (38° C.) in a water bath and the viscosity was re-measured. The cold paste viscosity did increase over the initial finished paste viscosities. However, the cold paste viscosity did not show the kind of viscosity increase over 24 and 48 hours that would be expected for a starch carrier paste. The 24 and 48 hour reheated paste viscosities were surprisingly close to the initial finished paste viscosity. This also would not have been expected for a starch carrier paste.

TABLE 3

Pilot Plant trials
No boron compound, low or no alkali, instant corrugating adhesive-
Viscosity expressed in Stein-Hall seconds

| Paste | Initial finished Viscosity/Temp. | 24 HR Viscosity | | 48 Hr Viscosity | | Comments |
|---|---|---|---|---|---|---|
| | | Cold | Hot, 100° F. | Cold | Hot, 100° F. | |
| Q1 | 60/84° F. | 61/68° F. | 36 | | | liquid layer |
| Q2 | 67/81° F. | 80/72° F. | 60 | 88/68° F. | 50 | liquid layer |
| Q3 | 26/93 | 27/72° F. | 25 | 30/68° F. | 25 | liquid layer |
| Q4 | 67/97° F. | 110/70° F. | 66 | | | no liquid layer |
| R1 | 60/108° F. | 500/84° F. | 500 | | | no liquid layer |
| S1 | 27/98° F. | 38/84° F. | 31 | | | liquid layer |

Example 4

In addition, Table 4 shows how shear stable Q4 was. We tried to shear this paste down at the end of the run. After almost 20 min. in a high shear mixer, the paste lost only 15 Stein-Hall seconds viscosity. A much greater drop was expected.

TABLE 4

Pilot plant trials
Paste Q4
High shear mixer (1)

| Time, Min | Stein-Hall Viscosity, sec |
|---|---|
| 0 | 73 |
| 1 | 73 |
| 3 | 72 |
| 5 | 68 |
| 7 | 67 |
| 9 | 64 |

TABLE 4-continued

Pilot plant trials
Paste Q4
High shear mixer (1)

| Time, Min | Stein-Hall Viscosity, sec |
|---|---|
| 13 | 62 |
| 19 | 58 |

(1) 4" dia head, 3 HP, 3500 RPM

Example 5

Pre-solubilized cellulosic extracts which were lower in solubilized fiber than Z-SOL were tested. More of this material has to be used compared with Z-SOL to provide enough soluble material to suspend the pearl starch.

Table 5 illustrates results for two pastes.

The first formula, R1 was made with a dried pre-solubilized cellulosic extract made from Vetter press fiber pre-treated with alkali. This paste was made with a pre-mix of 35% dried pre-solubilized cellulosic extract and 65% corn starch. Sulfuric acid was added to the paste to neutralize some caustic that remained in the extract after processing, but results indicated that this was not necessary. The quality of the board made using this material with no borax and no added alkali (neutral pH) indicated that a concentration of 35% is the maximum amount that can be employed in a corn starch composition with no added caustic.

The second formula, S1, used spent flake treated in the same manner as the Vetter press cake. This paste was made with a pre-mix of 28% dried pre-solubilized cellulosic extract and 72% corn starch. The paste was adjusted to neutral pH for the same reasons we neutralized the Vetter press material. The paste stuck board together, but the results indicated that a 28% concentration was the upper limit for this material in a neutral (no added alkali) paste. (Adding alkali to the paste (paste S8) improves the bond quality, but also requires a cut in the percent substitution because the alkali increases the finished paste viscosity.)

TABLE 5

Pilot Plant Trials
Lower purity soluble fiber    BEPEX Solidair process

| Run | R1 | S1 | S8 |
|---|---|---|---|
| Type of Fiber | Vetter Press | Spent flake | Spent flake |
| Type of pearl starch | Corn | Corn | Corn |
| Soluble fiber substitution, % | 35 | 28 | 28 |
| Boron Compound | No | No | No |
| Added Alkali | No | No | Yes |
| Formula | | | |
| Water, L | 43 | 54 | 33 |
| Heat, °F. | 120 | 120 | 100 |
| Soluble fiber, lb | 12.25 | 10.5 | 5.6 |
| Mix, Min | 5 | 2 | — |
| Sulfuric acid | 290 | 220 | — |
| Mix, Min | 5 | 5 | — |
| Pearl starch | 22.75 | 34.2 | 294 |
| Mix, Min | 10 | 10 | 10 |
| Finish temperature, °F. | 108 | 98 | — |
| Finish viscosity, Stein Hall Sec | 60 | 27 | 84 |
| Finish gel temperature, °F. | 165 | 169 | — |
| Finish pH | 5.9 | — | — |

TABLE 6

| | | Single-Facer Trial | | | | | |
|---|---|---|---|---|---|---|---|
| | | Edge Crush (#/In) | | Flat Crush (PSI) | | Single-Face Pin Adhesion (#/24 Ln In) | | Fiber Pull |
| Sample Identification | | Avg. | S.D. | Avg. | Std. | Average | Std. Dev. | (%) |
| 627-R1-KRH-12 | -300 | 23.4 | 1.5 | 29.5 | 0.6 | 39.2 | 2.3 | 0 |
| | -500 | 20.0 | 1.3 | 28.9 | 0.5 | 15.3 | 3.0 | 0 |
| | -600 | Loose liner | | — | — | — | — | — |
| 627-R1-KRH-12 | -500 | 18.3 | 1.0 | 29.1 | 0.5 | 18.5 | 4.1 | 0 |
| | -600 | Loose liner | | — | — | — | — | — |
| 627-S1-KRH-12 | -300 | 21.3 | 1.5 | 28.3 | 0.7 | 58.1 | 2.8 | 0 |
| | -500 | 19.3 | 1.9 | 28.1 | 1.0 | 20.1 | 3.7 | 0 |
| | -580 | 20.5 | 1.8 | 29.1 | 0.4 | 25.5 | 2.6 | 0 |
| 1114-S8-HPH-12 | -300 | 22.8 | 0.9 | 36.6 | 0.7 | 63.9 | 3.6 | 0 |
| | -500 | 22.3 | 1.0 | 38.3 | 1.0 | 55.6 | 2.4 | 0 |
| | -700 | Loose liner | | — | — | — | — | — |
| 1114-S8A-HPH-12 | -300 | 25.1 | 1.2 | 38.3 | 1.5 | 69.5 | 4.4 | 0 |
| | -500 | 23.6 | 1.9 | 36.4 | 0.8 | 59.4 | 4.5 | 0 |
| | -700 | 21.1 | 1.6 | 36.9 | 1.0 | 26.5 | 6.8 | 0 |

What is claimed is:

1. A dry blend composition which can be hydrated with water without cooking to make a corrugating adhesive comprising from about 95% to about 50% starch and from about 5% to about 50% of a dried pre-solubilized cellulosic extract containing from about 25%–100% dry basis soluble material, optional added alkali and no boron compound.

2. The composition of claim 1 wherein the dried pre-solubilized cellulosic extract has a particle size less than about 80 U.S. mesh.

3. The composition of claim 1 wherein the dried pre-solubilized cellulosic extract is derived from plant fiber or grain.

4. The composition of claim 1 wherein the dried pre-solubilized cellulosic extract is derived from corn fiber, wheat fiber or barley fiber.

5. The composition of claim 1 wherein the starch is selected from the group consisting of corn starch and barley starch.

6. The composition of claim 1 wherein the dried pre-solubilized cellulosic extract contains from about 70% to about 100% dry basis soluble material.

7. The composition of claim 1 comprising from about 8% to about 30% of the dried pre-solubilized cellulosic extract.

8. The composition of claim 1 wherein the dried pre-solubilized cellulosic extract has from about 3% to about 10% moisture.

9. A corrugating adhesive composition consisting of the dry blend composition of claim 1 and sufficient water to provide a total moisture content from about 80% to about 65%.

10. The composition of claim 9 having a pH from about 7 to about 14.

11. The composition of claim 9 having a gelatinization temperature of from about 54° C. to about 72° C.

12. A method of making a dry blend instant corrugating adhesive comprising admixing from about 95% to about 50% starch and from about 5% to about 50% of a dried pre-solubilized cellulosic extract containing from about 25%–100% dry basis soluble material.

13. A method of hydrating the composition of claim 1 comprising admixing with the composition sufficient water to provide a total moisture content of from about 65% to about 80% and for a sufficient time to hydrate the composition into a smooth paste.

14. The method of claim 13 wherein the sufficient time is from about 5 to about 10 minutes.

15. The method of claim 13 wherein hydrating is at a temperature from about 18°–52° C.

16. A method of making corrugated board comprising joining a corrugated medium to at least one liner using the corrugating adhesive composition of claim 9.

17. The corrugated board made by the method of claim 16.

* * * * *